2 Sheets--Sheet 1.

W. A. CLARKE.
Middlings-Purifiers.

No. 144,017. Patented Oct. 28, 1873.

Fig. I.

WITNESSES:
H. W. Dodge
J. C. Wildman

INVENTOR.
Millard A. Clarke
By his attys.
Dodge + Son

W. A. CLARKE.
Middlings-Purifiers.

No. 144,017.

2 Sheets--Sheet 2.

Patented Oct. 28, 1873.

WITNESSES:
W. H. Dodge
J. C. Wiedman

INVENTOR.
Willard A. Clarke.
By his attys
Dodge & Son

AM. PHOTO-LITHOGRAPHIC Co. N.Y. (OSBORNE'S PROCESS)

UNITED STATES PATENT OFFICE.

WILLARD A. CLARKE, OF MILWAUKEE, WISCONSIN, ASSIGNOR OF ONE-HALF HIS RIGHT TO E. P. ALLIS & CO., OF SAME PLACE.

IMPROVEMENT IN MIDDLINGS-PURIFIERS.

Specification forming part of Letters Patent No. 144,017, dated October 28, 1873; application filed June 19, 1873.

*To all whom it may concern:*

Be it known that I, WILLARD A. CLARKE, of Milwaukee, in the county of Milwaukee and State of Wisconsin, have invented certain Improvements in Middlings-Purifiers, of which the following is a specification:

My invention relates to a novel manner of constructing a middlings purifier or bolt; and consists, mainly, in combining with a bolt-reel a fan to exhaust the air therefrom, and automatic valves applied thereto to regulate the inward passage of air through the different portions of the bolting-cloth, as hereinafter more fully explained.

Figure 1:
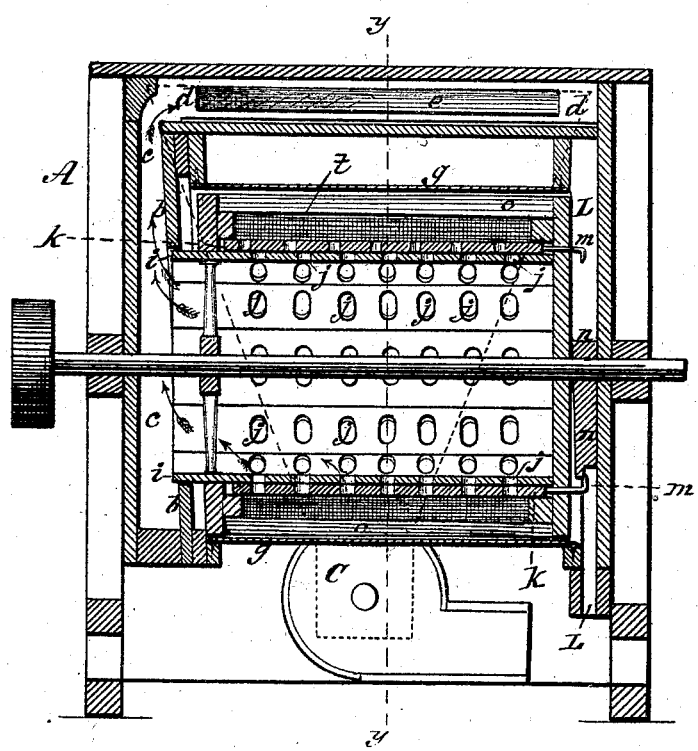
Figure 2:
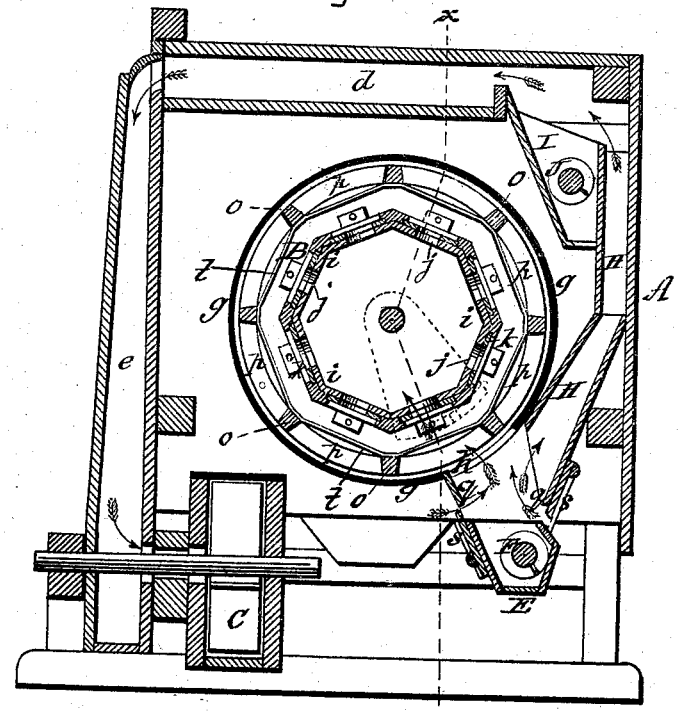
Figure 3:
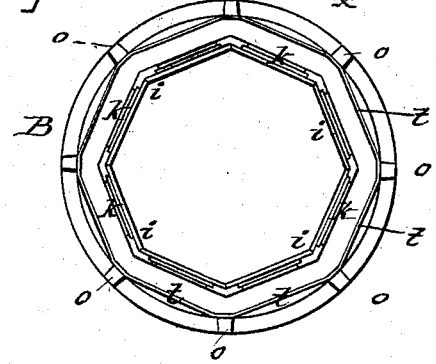

Figure 1 is a longitudinal vertical section of the machine on the line $x\ x$ of Fig. 2; Fig. 2, a transverse vertical section of the machine on the line $y\ y$ of Fig. 1; Fig. 3, a transverse section of the reel with its lining and valves.

In constructing my machine, I first provide a rectangular closed body, A, and mount therein a bolting-reel, B, at a slight inclination from a horizontal position. One end of the reel is closed, but I leave the other end open and extend it closely through a vertical partition, $b$, into an air space or chamber, $c$, as shown in Fig. 1. This space or chamber extends across the entire end of the machine, and communicates at the top with a horizontal chamber, $d$, which occupies the entire top of the machine. This chamber $d$ communicates with an outside passage or chamber, $e$, which extends downward to an exhaust-fan, C, located on the under side of the body. The fan causes a draft or suction from outside of the reel inward through the bolting-cloth into the interior of the reel, and thence, through the passage $c$, chamber $d$, and passage $e$, to the fan, and out of the machine, as indicated by the arrows. Around the outside of the reel I secure a stationary shell or casing, $g$, provided on its under side with a longitudinal opening, $h$, opposite that point at which the middlings commence to fall or slide toward the bottom of the reel. Inside of the reel, and so as to revolve therewith, I secure a cylinder or lining, $i$, provided with longitudinal rows of openings $j$, extending the entire length of the reel. Each row of openings I provide with a sliding valve or bar, $k$, having corresponding holes, so that by moving each valve the row of openings under it may all be opened and closed. The cylinder or lining and the valves are so arranged that, when all the valves are closed, no air can enter the interior of the reel. All air entering through the cloth $t$ must, before it can enter the interior of the reel, pass through the valve-openings. I provide each valve with an arm, $m$, and secure to the inside of the body a cam, $n$, which acts upon the arms in such manner that it opens and closes each valve as they are carried past the opening by the rotation of the reel. Only one slide or valve is open at a time, and this only for the instant while it is passing the opening $h$, so that there is a constant draft or suction through that portion of the bolting-cloth opposite the opening $h$, but through no other portions. It is obvious that, although only a small portion of the cloth is subject to the draft or suction at one time, the entire surface is acted upon in the course of each revolution of the reel. The longitudinal bars or ribs $o$ of the reel are outside of the cloth $t$, so that there is a space between the cloth and the casing $g$. The head or end piece of the reel extends out flush with the outside of the bars $o$, as shown, to prevent any air from entering between the bolt and the casing $g$. Under the opening $h$ in the casing I arrange a box or receptacle, E, containing a screw conveyer, F, and provided with inclined sides $q$ to guide the middlings to the conveyer. These sides or gatherers are each provided with a gate or slide, $s$, to admit air from without. I also provide the machine, across one whole side, with a passage, H, extending from the vacuum-chamber $d$ at the top down to the space under the opening $h$, and above the box E, so that there will be an upward draft or suction from said space, through the passage H, to the vacuum-chamber. At the top of the passage H, where it enters the vacuum-chamber $d$, but below the level of the latter, I place a box or dead-trap, I, provided with a conveyer, J, to detain and carry off any middlings that may find their way thereto. Behind the closed end of the reel there is a vertical passage or spout, L, to carry off the tailings. The shafts of the machine will of course be connected and operated by belts and pulleys, or by gearing suitably arranged.

The machine will also be provided with many other details usual in bolt-reels, and well understood by those skilled in the art, and which I do not, therefore, deem it necessary to describe or show.

The operation of the machine is as follows: The middlings are fed into the reel, and, falling on the cloth $t$, are acted upon by a current of air passing through the opening $h$ in the casing, and through the bolting-cloth and open valve into the interior of the cylinder or reel-lining $i$. This current of air carries the light particles of bran and brown stuff through the open valve into the cylinder, and thence through the chambers $c\ d$ and passage $e$ to the fan C. The purified middlings pass through the bolt-cloth and the opening $h$ into the box E, meeting in their descent two currents of air entering through the gates or slides $s$. These currents take up any dark particles that may still remain in the purified middlings, and carry them up through the passage H over the box or trap I, which catches and detains them. The lighter particles, such as dust and bran, which are not of sufficient weight to fall into the box or trap I, are carried across the vacuum-chamber $d$, and down through the passage $e$ to the fan. The impure middlings that are too coarse and heavy to pass through the bolt-cloth, or to be carried off by the currents of air, pass off at the end of the reel into the chamber or spout L, which deposits them under the machine.

Having thus described my invention, what I claim is—

1. In combination with a bolt-reel, a series of automatic valves, applied and operating substantially as shown, to control the admission of air through the bolt-cloth into the reel, and a fan arranged to exhaust the air from the interior of the reel, substantially as shown and described.

2. The reel B, provided with the inside cylinder or lining $i$, having holes $j$ and valves $k$, in combination with the stationary cam $n$, or its equivalent, for operating the valves.

3. In combination with the reel provided with the lining and valves, as set forth, the surrounding casing $g$, provided with the opening $h$, and a fan arranged to exhaust the air from the reel, as set forth and shown.

4. In combination with the body A, provided with the fan C, passage $e$, vacuum-chamber $d$, passage $c$, and casing $g$, with its opening $h$, the reel B, provided with the lining $i$ and automatic valves $k$, substantially as shown and described.

5. The bolt-reel inclosed within the tight casing $g$, having the opening $h$, in combination with the passage H, communicating with said opening, and the fan C, arranged to exhaust the air from both the reel and the passage, said parts being constructed and arranged as shown, so that the air-currents act upon a small portion only of the cloth at one time.

WILLARD A. CLARKE.

Witnesses:
W. H. WATSON,
WILLIAM S. CHASE.